United States Patent
Klein et al.

(10) Patent No.: US 12,266,043 B2
(45) Date of Patent: Apr. 1, 2025

(54) GRAPH FEATURE FOR CONFIGURING ANIMATION BEHAVIOR IN CONTENT RENDERINGS

(71) Applicant: Figma, Inc., San Francisco, CA (US)

(72) Inventors: Nikolas Klein, San Francisco, CA (US); William Wu, San Francisco, CA (US); Ricky Rajani, San Francisco, CA (US); Sho Kuwamoto, San Francisco, CA (US); Rachel Miller, San Francisco, CA (US)

(73) Assignee: FIGMA, INC., San Francisco, CA (US)

( * ) Notice: Subject to any disclaimer, the term of this patent is extended or adjusted under 35 U.S.C. 154(b) by 0 days.

(21) Appl. No.: 18/144,093

(22) Filed: May 5, 2023

(65) Prior Publication Data

US 2023/0386118 A1 Nov. 30, 2023

Related U.S. Application Data

(60) Provisional application No. 63/339,814, filed on May 9, 2022.

(51) Int. Cl.
*G06T 13/80* (2011.01)
*G06F 3/04847* (2022.01)

(52) U.S. Cl.
CPC .......... *G06T 13/80* (2013.01); *G06F 3/04847* (2013.01); *G06T 2200/24* (2013.01)

(58) Field of Classification Search
None
See application file for complete search history.

(56) References Cited

U.S. PATENT DOCUMENTS

| | | |
|---|---|---|
| 7,752,559 B1 | 7/2010 | Szpak |
| 8,209,657 B1 | 6/2012 | Sawyer et al. |
| 8,312,416 B2 | 11/2012 | Freund |
| 8,726,228 B2 | 5/2014 | Ravindran et al. |
| 10,114,733 B1 | 10/2018 | Varghese |
| 10,181,059 B1 | 1/2019 | Brewton |
| 10,521,197 B1 | 12/2019 | Ciolfi et al. |
| 10,997,217 B1 | 5/2021 | Nielsen |
| 11,829,689 B1 | 11/2023 | Kottamadal et al. |

(Continued)

FOREIGN PATENT DOCUMENTS

| | | |
|---|---|---|
| EP | 3719752 | 10/2020 |
| JP | 2008021221 A | 1/2008 |

(Continued)

OTHER PUBLICATIONS

Bezier Animations, UI Elements to Flutter Widgers (Part 1), by Kamalesh Basu, Published in TheBrand.app on Jan. 29, 2020. 25 pages.

(Continued)

*Primary Examiner* — Toan H Vu
(74) *Attorney, Agent, or Firm* — Squire Patton Boggs LLP; Sarah Mirza

(57) ABSTRACT

A computing system to generate an interactive animation interface, including a graph feature that is manipulatable to enable a user to specify one or more parametric values to configure an animation behavior of an associated content rendering. The computing system generates the animation behavior for the content rendering based on the one or more parametric values specified by the user.

18 Claims, 10 Drawing Sheets

(56) References Cited

U.S. PATENT DOCUMENTS

| | | | |
|---|---|---|---|
| 11,853,690 B1 | 12/2023 | Zhang et al. | |
| 2007/0006136 A1* | 1/2007 | Hirschberg | G06F 9/451 |
| | | | 717/143 |
| 2008/0036776 A1* | 2/2008 | Niles | G06T 13/20 |
| | | | 345/474 |
| 2010/0017695 A1 | 1/2010 | Palmieri | |
| 2013/0086529 A1 | 4/2013 | Singh et al. | |
| 2013/0239001 A1 | 9/2013 | Maloney et al. | |
| 2014/0071133 A1* | 3/2014 | Chu | G06T 11/206 |
| | | | 345/440 |
| 2014/0356822 A1* | 12/2014 | Hoque | G09B 19/04 |
| | | | 434/185 |
| 2016/0048388 A1 | 2/2016 | Eksten | |
| 2016/0274776 A1 | 9/2016 | Scheff | |
| 2016/0371312 A1 | 12/2016 | Ben-Aharon et al. | |
| 2018/0174346 A1* | 6/2018 | Fratarcangeli | G06T 13/20 |
| 2018/0268608 A1* | 9/2018 | Schneider | G06F 3/04815 |
| 2018/0308276 A1* | 10/2018 | Cohen | G06T 15/205 |
| 2019/0035149 A1* | 1/2019 | Chen | G06V 40/166 |
| 2019/0325626 A1 | 10/2019 | Tao | |
| 2022/0012071 A1 | 1/2022 | Kim | |
| 2022/0083316 A1 | 3/2022 | Andersson | |
| 2022/0101582 A1 | 3/2022 | Uzgin et al. | |
| 2022/0245618 A1 | 8/2022 | King et al. | |
| 2023/0306667 A1* | 9/2023 | Hopkins | B25J 13/06 |
| 2023/0400971 A1* | 12/2023 | Tai | G06F 3/04845 |
| 2023/0418562 A1 | 12/2023 | Andersson | |
| 2024/0143869 A1 | 5/2024 | Klein | |

FOREIGN PATENT DOCUMENTS

| | | |
|---|---|---|
| WO | WO 2022/061027 | 3/2022 |
| WO | WO 2023/219970 | 11/2023 |
| WO | WO 2024/091964 | 5/2024 |

OTHER PUBLICATIONS

International Search Report and Written Opinion mailed Aug. 12, 2024 in PCT/US2024/034867 (UP-036-3WO).

International Search Report and Written Opinion mailed Aug. 20, 2024 in PCT/US2024/034864 (UP-036-2WO).

International Search Report and Written Opinion mailed Sep. 4, 2024 in PCT/US2024/034855 (UP-036-1WO).

Prototyping Easing Curves, The Wayback Machine by Figma Help Center. Found at:https://web.archive.org/web/20240000000000*/Prototyping%20Easing%20Curves7 pages.

Written Opinion of the International Preliminary Examining Authority mailed Sep. 16, 2024, for related PCT/US2023/0076500, filed Oct. 10, 2022, 6 pages.

Written Opinion of The International Preliminary Examining Authority mailed Sep. 18, 2024, for related PCT/US2023/0077671, filed Oct. 24, 2023, 8 pages.

International Search Report and The Written Opinion of The International Searching Authority mailed Dec. 22, 2021, for related PCT/US2021/050734 filed Sep. 16, 2021, 66 pages.

Paper by WeTransfer—Simple Sketch App, "Creativity at your fingertips" URL:https://web.archive.org/web/20220121205009/https://wetransfer.com/paper, 9 pages.

Jarzabek et al., "XVCL: XML-based Variant Configuration Language", IEEE, pp. 1-2 (Year: 2003).

Kriouile et al., "Towards Flexible and Reusable SaaS for Multi-tenancy", IEEE, pp. 1-7 (Year: 2014).

International Search Report and The Written Opinion of The International Searching Authority mailed Aug. 23, 2023, for related PCT/US2023 filed May 8, 2023, 11 pages.

Written Opinion of The International Preliminary Examining Authority mailed Apr. 10, 2024, for related PCT/US2021/050734, filed Sep. 16, 2021, 7 pages.

International Preliminary Report on Patentability mailed Jul. 2, 2024, for related PCT/US2021/050734, filed Sep. 16, 2021, 8 pages.

International Search Report and The Written Opinion of The International Searching Authority mailed Feb. 16, 2024, for related PCT/US2023/077671, filed May 2, 2024, 11 pages.

Paper by Figma—"Guide to Prototyping in Figma", URL https://web.archive.org/web/2022102202/0956, https://help.figma.com/hc/en-us/articles/360040314193 "Flows and Starting Points" "Create Connections", Oct. 22, 2022, 8 pages.

Bibliographic information for "Figma Tutorial: Build and present interactive prototypes", https://www.youtube.com/watch?v=X5qiBwqptek, Feb. 5, 2024, 2 pages.

Bibliographic information for "Figma Tutorial: Prototyping", https://www.youtube.com/watch?v=sAAa-CCOcg, Feb. 27, 2024, 2 pages.

Paper by Figma—"Frames in Figma", URL https://web.archive.org/web/20221004002738/ https://help.figma.com/hc/en-us/articles/360041539473-Frames-in-Figma , Oct. 10, 2022, 11 pages.

Kravchuck-Kirilyuk, "Persimmon: Nested Family Polymorphism with Extensible Variant Types", ACM, pp. 1-27 (Year: 2024).

Akerholm et al., "A Model for Reuse and Optimization Software of Embedded Software Components," IEEE, pp. 567-572. Year: 2007.

* cited by examiner

GRAPH FEATURE FOR CONFIGURING ANIMATION BEHAVIOR IN CONTENT RENDERINGS

RELATED APPLICATIONS

This application claims benefit of priority to Provisional U.S. Patent Application No. 63/339,814, filed May 9, 2022; the aforementioned priority application being hereby incorporated by reference in its entirety.

TECHNICAL FIELD

Examples described herein relate to a graph feature for configuring animation behavior in content renderings.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

DETAILED DESCRIPTION

Figure 1A:
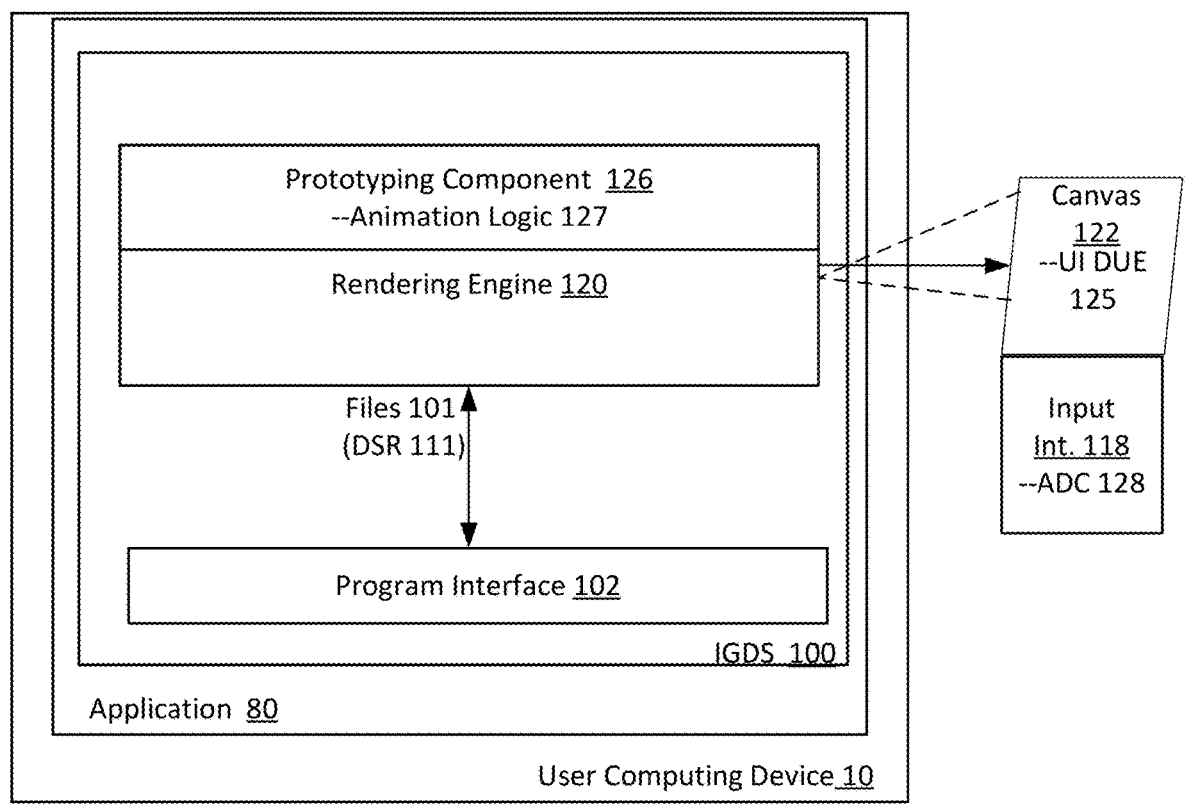
FIG. 1A illustrates an interactive graphic design system for a computing device of a user, according to one or more examples.

A computing system to generate an interactive animation interface, including a graph feature that is manipulatable to enable a user to specify one or more parametric values to configure an animation behavior of an associated content rendering. The computing system generates the animation behavior for the content rendering based on the one or more parametric values specified by the user.

While some examples described are in context of an interactive graphic design application (IGAP), embodiments as described can be implemented on other applications for enabling users to create graphic content (e.g., whiteboarding application, etc.).

Still further, in some examples, a network computer system is provided to include memory resources store a set of instructions, and one or more processors are operable to communicate the set of instructions to a plurality of user devices. The set of instructions can be communicated to user computing devices, in connection with the user computing devices being operated to render a corresponding design under edit on a canvas, where the design under edit can be edited by user input that is indicative of any one of multiple different input actions. The set of instructions can be executed on the computing devices to cause each of the computing devices to determine one or more input actions to perform based on user input. The instructions may further cause the user computing devices to implement the one or more input actions to modify the design under edit. For at least a first computing device, the instructions can be executed to cause the first computing device to determine the one or more input actions to perform by:

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a non-transitory computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described below, the IGDS 100 can be implemented through use of a web-based application 80. As an addition or alternative, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, the user may initiate a session to implement the IGDS 100 for purpose of creating and/or editing a design interface. In examples, the IGDS 100 includes a program interface 102, an input interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the input interface 118, to enable the user to provide input for creating and/or editing a design interface.

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screentap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the user. The retrieved data sets can include one or more pages that include design elements which collectively form a design interface, or a design interface that is in progress. Each file 101 can include one or multiple data structure representations 111 which collectively define the design interface. The files 101 may also include additional data sets which are associated with the active workspace. For example, as described with some examples, the workspace file can store animation data sets which define animation behavior as between objects or states in renderings of the canvas 122.

In examples, the rendering engine 120 uses the data structure representations 111 to render a corresponding DIUE 125 on the canvas 122, wherein the DIUE 125 reflects graphic elements and their respective attributes as provided with the individual pages of the files 101. The user can edit the DIUE 125 using the input interface 118. Alternatively, the rendering engine 120 can generate a blank page for the canvas 122, and the user can use the input interface 118 to generate the DIUE 125. As rendered, the DIUE 125 can include graphic elements such as a background and/or a set of objects (e.g., shapes, text, images, programmatic elements), as well as attributes of the individual graphic elements. Each attribute of a graphic element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the DIUE 125.

Network Computing System to Implement IGDS

Figure 1B:
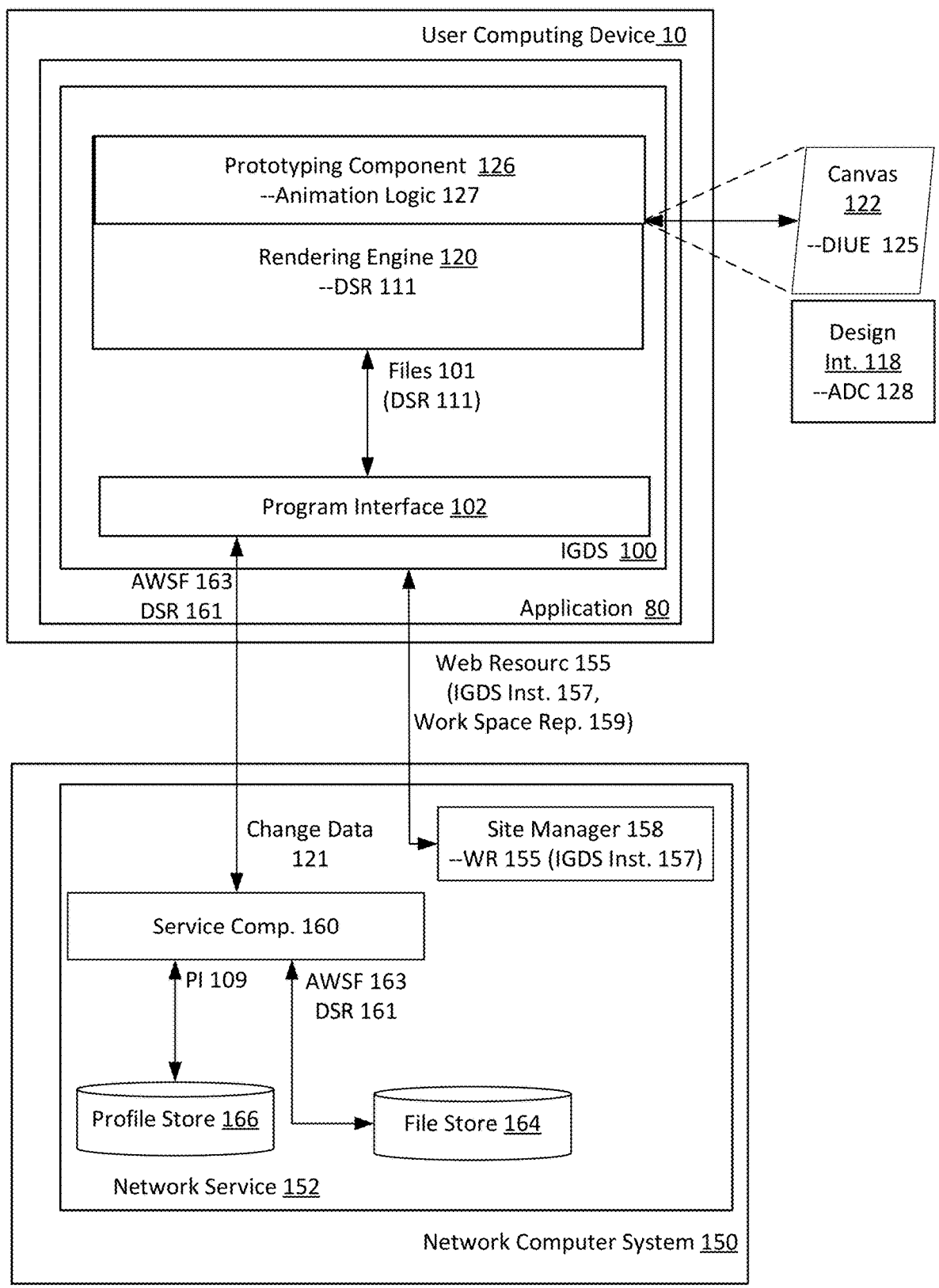
FIG. 1B illustrates a network computing system to implement an interactive graphic design system on a user computing device, according to one or more examples.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 perform operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web resources 155 can, for example, embed logic (e.g., JAVASCRIPT code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resources 155. Upon accessing the website, web-based application 80 can automatically (e.g., through saved credentials) or through manual input, communicate an account identifier to the service component 160. In some examples, web-based application can also communicate one or more additional identifiers that correlate to a user identifier.

Additionally, in some examples, the service component 160 can use the user or account identifier of the user identifier to retrieve profile information 109 from a user profile store 166. As an addition or variation, profile information 109 for the user can be determined and stored locally on the user's computing device 10.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

Additionally, in examples, the service component 160 provides a representation of the workspace associated with the user to the web-based application 80, where the representation identifies, for examples, individual files associated with the user and/or user account. The workspace representation can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application initiates the canvas 122. For example, the IGDS 100 can initiate an HTML 5.0 canvas as a component of web-based application 80, and the rendering engine 120 can access one or more data structures representations 111 of a design interface under edit, to render the corresponding DIUE 125 on the canvas 122.

The service component 160 may also determine, based on the user credentials, a permission setting or role of the user in connection with the account identifier. The permission settings or role of the user can determine, for example, the files which can be accessed by the user. In some examples, the implementation of the rendering engine 120 on the computing device 10 can be configured based at least in part on the role or setting of the user. For example, the user's ability to specify constraints for the DIUE 125 can be determined by the user's permission settings, where the user can be enabled or precluded from creating constraints for the DIUE 125 based on their respective permission settings. Still further, in some variations, the response action which the user can take to resolve a conflict can be limited by the permission setting of the user. For example, the ability of the user to ignore constraints can be based on the permission setting of the user.

In examples, the changes implemented by the rendering engine 120 to the DIUE 125 can also be recorded with the respective data structure representations 111, as stored on the computing device 10. The program interface 102 can repeatedly, or continuously stream change data 121 to the service component 160, wherein the updates reflect edits as they are made to the DIUE 125 and to the data structure representation 111 to reflect changes made by the user to the DIUE 125 and to the local data structure representations 111 of the DIUE 125. The service component 160 can receive the change data 121, which in turn can be used to implement changes to the network-side data structure representations 161. In this way, the network-side data structure representations 161 for the active workspace files 163 can mirror (or be synchronized with) the local data structure representations 111 on the user computing device 10. When the rendering engine 120 implements changes to the DIUE 125 on the user device the changes can be recorded or otherwise implemented with the local data structure representations 111, and the program interface 102 can stream the changes as change data 121 to the service component 160 in order to synchronize the local and network-side representations 111, 161 of the DIUE 125. This process can be performed repeatedly or continuously, so that the local and network-side representations 111, 161 of the DIUE 125 remain synchronized.

Collaborative Network Platform

Figure 1C:
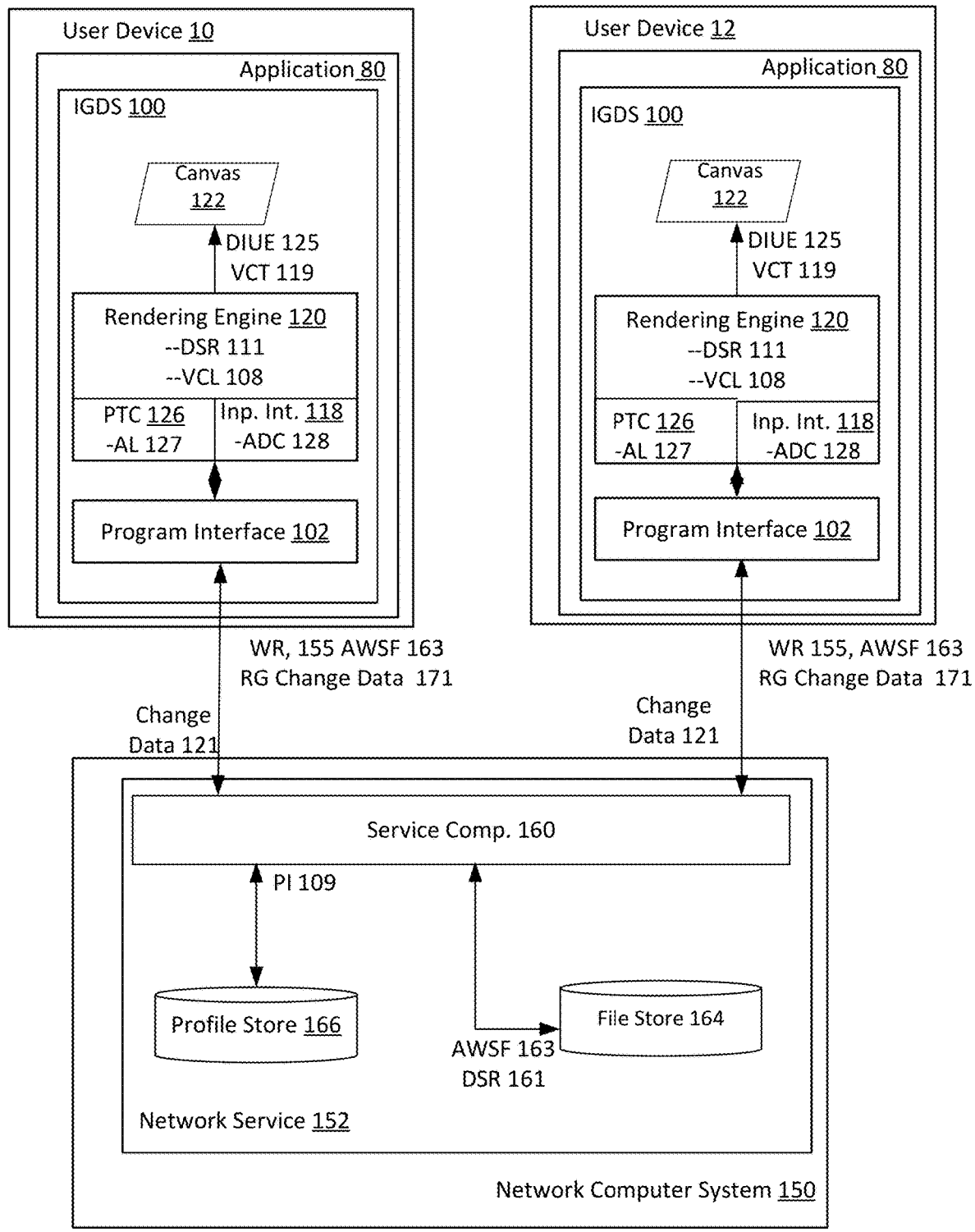
FIG. 1C illustrates a network computing system to implement an interactive graphic design system for multiple users in a collaborative network platform, according to one or more examples.

FIG. 1C illustrates a network computing system to implement an interactive graphic design system for multiple users in a collaborative network platform, according to one or more examples. In an example of FIG. 1C, a collaborative network platform is implemented by the network computing system 150, which communicates with multiple user computing devices 10, 12 over one or more networks (e.g., World Wide Web) to implement the IGDS 100 on each computing device. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing a corresponding IGDS 100 to access the same workspace during respective sessions that overlap with one another. Accordingly, each of the user computing devices 10, 12 may access the same set of active workspace files 163 at the same time, with the respective program interface 102 of the IGDS 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the DIUE 125 of the active workspace files 163 at the same time. Additionally, each of the computing devices 10, 12 can maintain a local data structure representation 111 of the respective DIUE 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by users to the DIUE 125 on one computing device 10, 12 may be immediately reflected on the DIUE 125 rendered on the other user computing device 10, 12. By way of example, the user of computing devices 10 can make a change to the respective DIUE 125, and the respective rendering engine 120 can implement an update that is reflected in the local copy of the data structure representation 111. From the computing device 10, the program interface 102 of the IGDS 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IGDS 100 to update the DIUE 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the DIUE 125 and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the DIUE 125 as rendered on the second computing device 12). In turn, the network computing system 150 can stream remotely generated change data 171 (which in the example provided, corresponds or reflects change data 121 received from the user device 12) to update the local data structure representation 111 of the DIUE 125 on the first computing device 10. In this way, the DIUE 125 of the first computing device 10 can be updated as a response to the user of the second computing device 12 providing user input to change the DIUE 125.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart the maintenance of the data structure representation of the DIUE 125 that is rendered and edited on that device.

With reference to FIG. 1A through FIG. 1C, the IGDS 100 can implement user-configurable animations as between content elements of a design. In examples, the rendering engine 120 can render, for example, a series of frames in series, to implement a prototyping mode. In this context, the rendering engine 120 can include a prototyping (or simulation) component 126 to implement prototyping mode. Further, the prototyping component can execute animation logic 127 to render animation behavior, in accordance with user input, when the prototyping mode is implemented. In this way, as described with examples, IGDS 100 can implement the prototyping mode with animations while a workspace file is open and a design rendered. Further, in some examples, the IGDS 100 can implement the prototyping mode to enable the designer to view, configure, edit and update animation behaviors as between selected objects or states. Accordingly, in examples, the IGDS 100 can be implemented in alternative modes: (i) design mode, where individual frames (e.g., object(s) with attributes) are rendered statically, with tools and features to allow for the user to make edits to the attributes of the frame/object; and (ii) prototyping mode, where a series of frames are sequentially rendered to simulate the dynamic implementation of the design in a production environment.

Further, as described, the rendering engine 120 can implement animation logic to simulate animations that are configured by the user via an animation design component 128. In examples, the input interface 118 can include an animation design component 128 (also see FIG. 2) which can receive user input to select and configure animation behavior. The input interface 118 can, for example, provide a graph interface from which the user can configure animation behavior as between select objects/states. In examples, the IGDS 100 implements an animation design component, such as described with examples provided below.

Animation Design

Figure 2A:
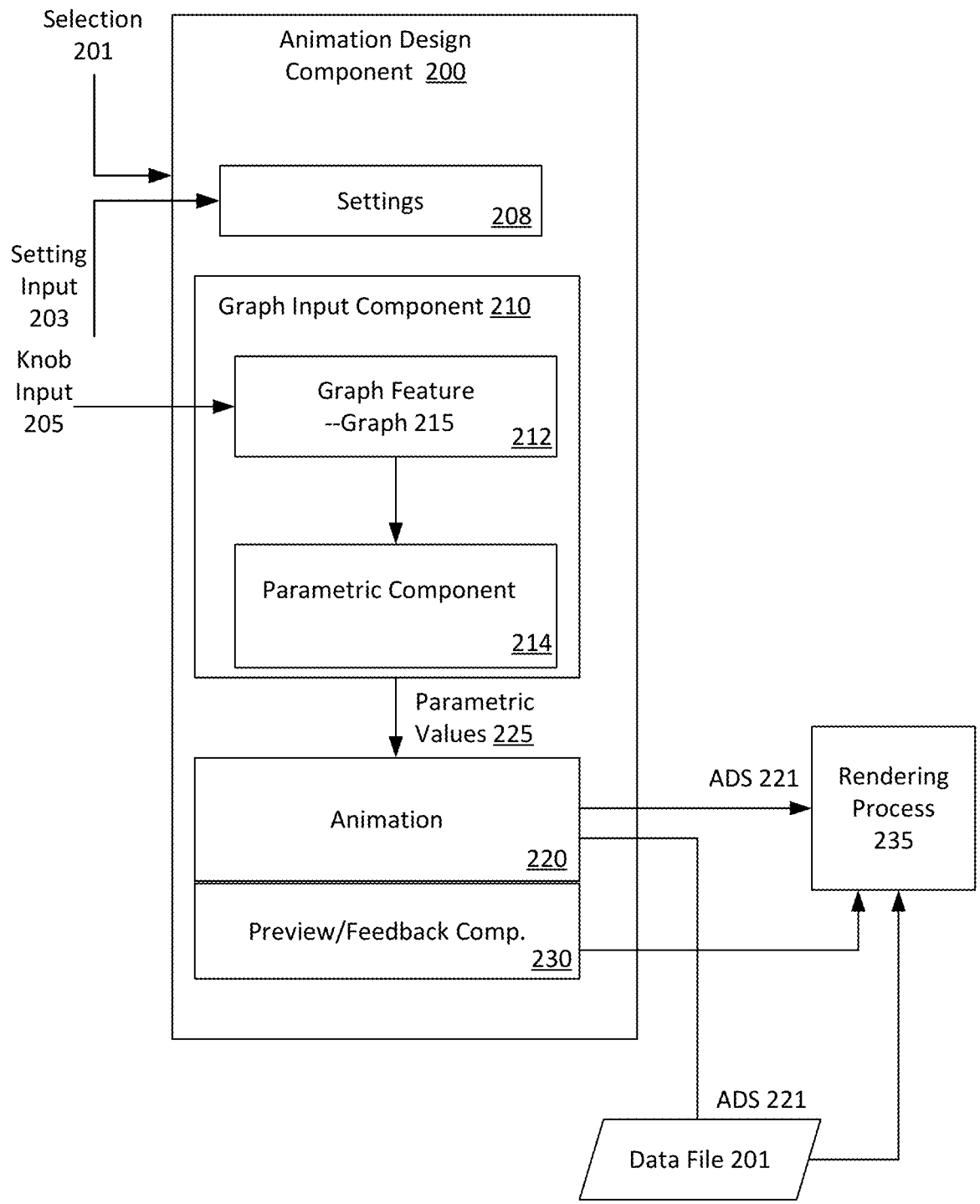
FIG. 2A illustrates an example of an animation design component, according to one or more embodiments.

FIG. 2A illustrates an example of an animation design component, according to one or more embodiments. In embodiments, animation design component 200 enables designers to configure animations as between objects using a graph feature that is representative of animation behavior. The animation design component 200 can be implemented in a variety of content generating applications, including applications for graphic design, artistic creation and presentations. In the context of an interactive graphic design system ("IGDS 100") of FIG. 1A through FIG. 1C, animation design component 200 is representative of animation design component 128. In such context, animation design component 200 can be integrated or otherwise provided with rendering engine 120. However, while some examples provide for the animation design component 200 to be implemented as part of IGDS 100, other embodiments provide for the animation design component 200 to be used with other types of applications where users can configure animation as between select content elements.

A user can interact with the animation design component 200 to specify and configure animation as between objects or states (e.g., state of an object or collection of objects), with the desired animation reflecting a transition as between objects, frames or states. In examples, a state is provided by a set of variants that are rendered concurrently on a canvas and linked in a manner that reflects a sequence, with the sequence representing different states of a designed feature or interface. For example, in context of IGDS 100, a designer may create a series of frames (or variants) that differentiate from one another by changes to specific properties, with each frame of the series reflecting a state of a designed object (e.g., functional user interface). Each frame can correspond to, for example, an object or combination of objects have a set of attributes (e.g., shape). The designer can use animation design component 200 to create animation as between the individual frames of the series, with the purpose of the animation being to provide an end user of the user interface with visual feedback that reflects the occurrence of the state change. In examples, when the IGDS is operated in a design mode, the frames can be static, to allow the designed to edit and update the objects. The designer can switch modes to prototyping, where the design under edit simulates a production environment. Accordingly, in prototyping mode, the design under edit is rendered dynamically—or in animated fashion, where designated frames of the design are rendered in a specified sequence. In this context, the IGDS 100 can include functionality to render the animation for the design user, in order to simulate the experience of the end user. Further, in examples, animation can be provided with respect to the transition of individual frames in sequence. For example, the IGDS 100 can include a prototyping feature, where the rendering engine 120 generates an animation that reflects the state changes, with transitional animations between states in a manner that simulates the end user experience. Through this interaction, the designer can view the end user experience and make refinements to the respective design interfaces as needed.

In examples, the animation design component 200 can be provided as a tool panel or interface for a canvas on which design or other content rendering is provided. A designer can interact with animation design component 200 to specify input 201 to select objects, frames or states (e.g., which may include layers or variants) that are to serve as starting and ending points for a desired animation. Accordingly, the selection input 201 can be provided with respect to content rendered on a canvas that the user is actively editing/updating. The user can also specify a trigger, such as a detectable event (e.g., end user input) which is to initiate the animation.

The designer can interact further with the animation design component 200 to provide input for configuring a desired transitional animation as between a selected starting and ending point. In examples, the user can provide configuration input through multiple input features of the animation design component 200. For example, the animation design component 200 can include menu features and other input mechanisms (collectively represented by settings 208) to enable the user to select predefined settings for a desired animation behavior. The user can make a settings selection 203 to identify a predefined set of properties for a type of animation (e.g., selection of Bezier or easing curves, type of motion or effect caused by animation, etc.) that is desired for a selected starting and ending point.

In examples, the animation design component 200 can also enable the user to customize an animation behavior through user-specified values that define the behavior of the animation. The animation design component 200 can also include a graph input component 210 that includes a graph feature 212. The graph feature 212 can include logic for (i) displaying a graph that represents a current set of properties for an animation behavior, (ii) processing user input that directly manipulate the displayed graph so as to alter a shape of the graph, and (iii) change the properties of the animation behavior to reflect the changes to the graph.

In some examples, the graph feature 212 can visually represent an animation behavior as a spring equation (e.g., spring force or motion). The graph input component 210 can represent or define the animation behavior in terms of parametric values for the equation (e.g., spring motion) of the graph provided by the graph feature 212. For example, in the context of a spring equation, the animation behavior can be defined in terms of parametric values that reflect properties of mass, damping, stiffness, velocity, acceleration, etc. The graph input component 210 can include a parametric component 214 that calculates and displays a set of parametric values for a current form of the graph provided by the graph feature 212. The parametric values can be displayed in a panel or region that accompanies the graph feature 212.

As described by examples, the graph feature 212 can include a graph 215 (e.g., line segment with profile, extending in X and Y directions) that is directly manipulatable by input from the user. The manipulation defines the properties for desired animation behavior, and the properties may be reflected by parametric values that are calculated and rendered in the region accompanying the graph feature 212. The interaction of the user with the graph, and the resulting changes to the properties of the animation behavior can be made in real-time. In this way, the user is able to visualize changes made to the animation behavior with minimal aversion of attention.

In examples, the graph feature 212 can process graph input 205 from the user in order to alter the shape or profile of the displayed graph. The graph input 205 can include input that selects one or more points on a graph 215, and stretches or pulls the point on the graph to alter the profile of the graph in a particular manner. The manner in which the graph 215 is altered as a response to the graph input 205 can be based in part on the equation (e.g., spring force or motion) that is represented by the displayed graph. By way of illustration, in the context of a spring equation, the graph 215 can represent displacement of an object over time, with the graph reflecting one or more oscillations that are based on spring properties (e.g., stiffness, damping). The resulting animation can generate directional changes as if one object is attached to a spring (e.g., like a mass on a spring). In this way, the characteristics of the object's movements may be defined by the properties reflected by the graph. As a spring equation, the user's manipulation of the graph in one location can alter the shape of the graph in other locations. For example, the user can increase the amplitude of the initial oscillation, reflecting lesser damping. The graph provided by the graphing feature 212 can incorporate the lesser damping value such that the remainder of the graph shows additional oscillations and/or greater amplitude of downstream oscillations.

In some examples, the settings input 203 identifies an initial form of the graph rendered by the graph feature 212. For example, the settings input 203 can select the spring equation (including spring properties), as well as preset values for the spring equation. The graph feature 212 can render the graph 205 for the user in accordance with the preset values and equation. For example, the graph feature 212 can identify settings of "gentle" or "bouncy", and responsive to setting input 203, the graph feature 212 can generate the initial graph based on preset values associated with the setting.

The animation design component 200 can include animation component 220 to determine an animation data set ("ADS 221") that defines an animation or animation configuration for the selected starting and ending points. The animation component 220 determines the ADS 221 based on the calculated parametric values 225 that result from the designer's manipulation of the graph 215. The ADS 221 can, for example, determine easing curves as between keyframes, to reflect the set of parametric values 225 which are generated from the user's interaction with the graph feature 212.

In examples, the animation design component 200 associates the determined ADS 221 with objects, frames or states that are specified by the input 201. In some implementations, the animation design component 200 can store the ADS 221 as part of a workspace file, in association with the specified objects frames or states. Still further, the ADS 221 can be used by a rendering process 235, such as may be executed by the rendering engine 120 when prototyping mode is implemented. For example, the rendering engine 120 can, based on the ADS 221, execute animation logic 127 to render the animation in response to input from the designer, such as the designer selecting to operate a prototype program on the design elements that are associated with the ADS 221. As an addition or variation, the ADS 221 can be rendered with the associated objects/states by the rendering engine 120, such as through a prototyping feature where a designed can view animations with the canvas on which the design is provided.

While some examples describe the graph feature 212 generating a graph 215 based on an equation (e.g., spring equation), in variations, the graph can be manipulated by the user to alter its shape using, for example, curve fitting processes. In such variations, the user can use a knob feature or similar element to specify, for example, one or more peaks for the line graph 215, and the graph feature may use curve fitting to render the graph to match the user's input. Additionally, while spring equations are specifically mentioned in examples, variations may use alternative equations, including alternative equations that represent physical systems.

In examples, the animation design component 200 also includes a preview or feedback component 230. The component 230 can generate an animation that represents or is otherwise indicative of the animation behavior resulting from the configurations specified by parametric values 225. For example, the component 230 can render a reference object, or multiple reference objects, which exhibit movement in a manner that reflects the parametric values 225. In implementations, the reference objects can be generic or tailored for the particular objects/states that represent starting and ending points for the desired animation behavior.

Methodology

Figure 2B:
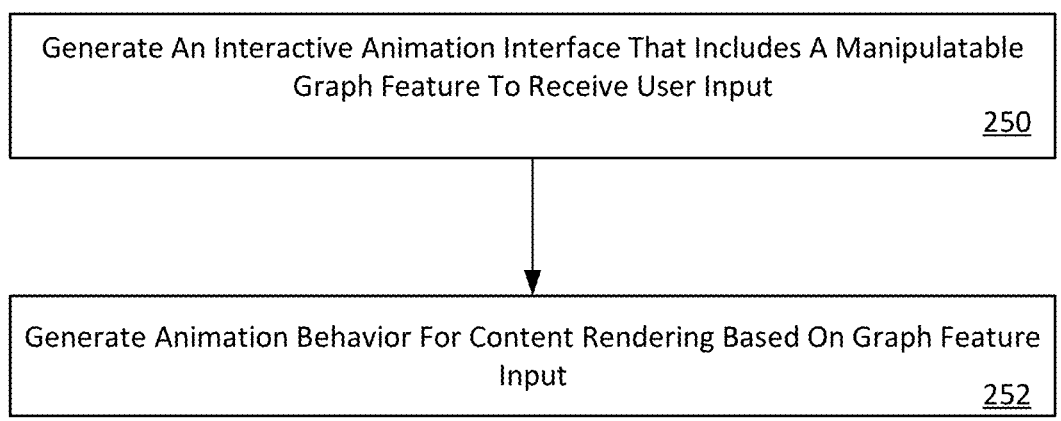
FIG. 2B illustrates a method for configuring animation behavior of content elements, according to one or more embodiments.

FIG. 2B illustrates a method for configuring animation behavior of content elements, according to one or more embodiments. A method such as described by an example of FIG. 2B may be implemented on a user computing device that implements an animation design component to generate animations for graphic content elements rendered on a canvas. Accordingly, reference may be made to elements of FIG. 1A through FIG. 1C and FIG. 2A for purpose of illustrating suitable components for performing a step or sub-step being described.

With reference to FIG. 2B, a computing device operates to provide an interactive animation interface to a designer (250). The interactive animation interface includes a graph feature that is manipulatable to enable the designer to configure an animation behavior of a content rendering.

The computer device further operates to generate the animation behavior for the content rendering based on the one or more parametric values that is specified by the user (252).

EXAMPLES

FIG. 3, FIG. 4A through FIG. 4D, FIG. 5 and FIG. 6C illustrate alternative examples of a tool panel for implementing a graph input component, according to one or more embodiments. Example tool panels as described may be generated as part of a content rendering application, such as by IGDS 100, as described by FIG. 1A through FIG. 1C.

Figure 3:
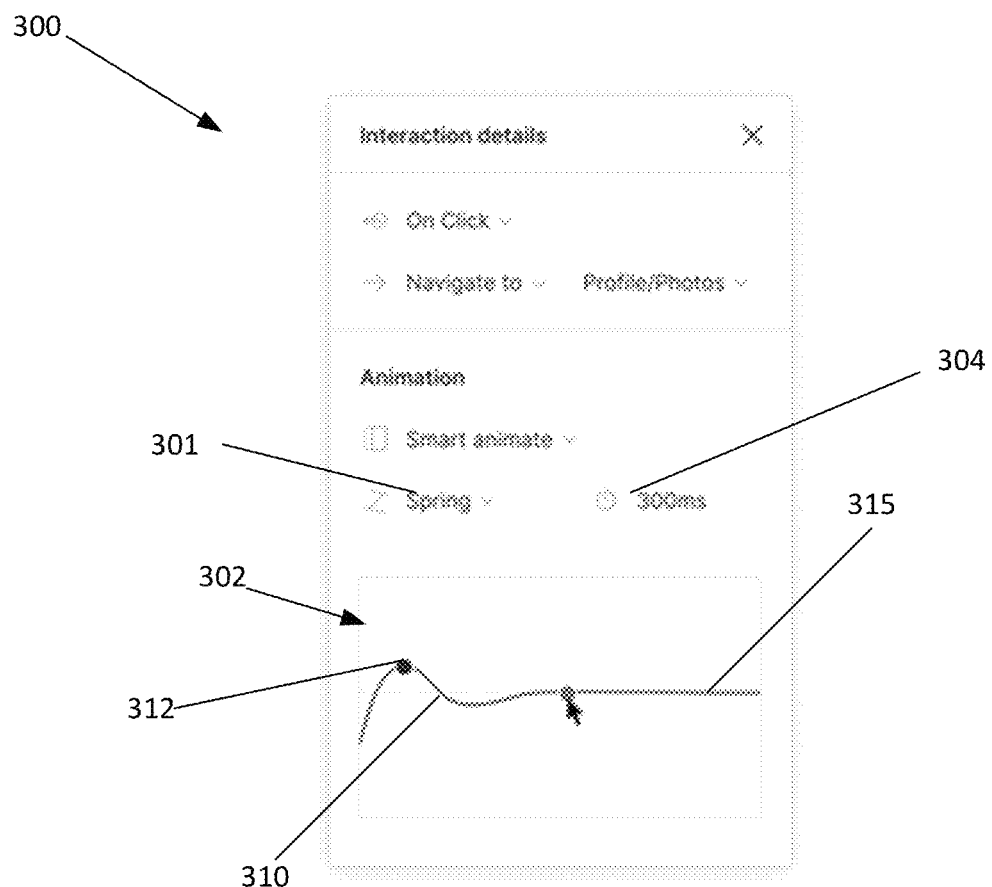
FIG. 3 illustrates an example tool panel having a graph feature, according to one or more embodiments.
Figure 4A:
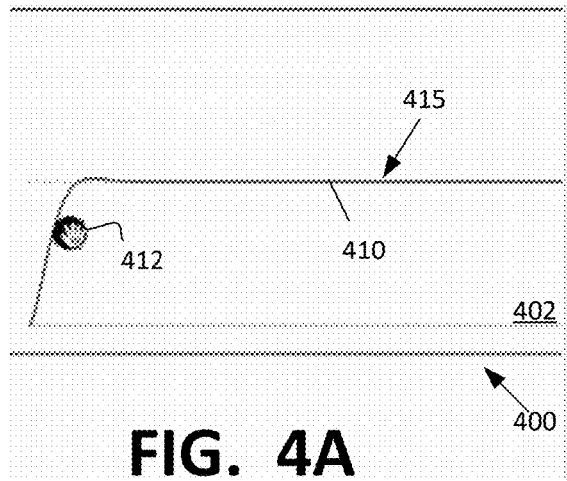
FIG. 4A through FIG. 4D illustrate an example tool panel that incorporates a graph feature, according to one or more embodiments.
Figure 4B:
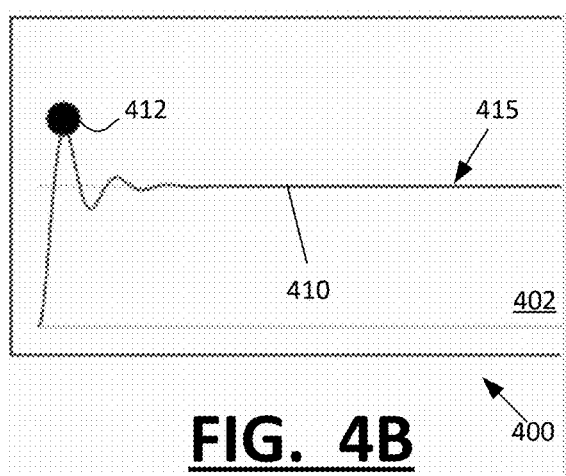
Figure 4C:
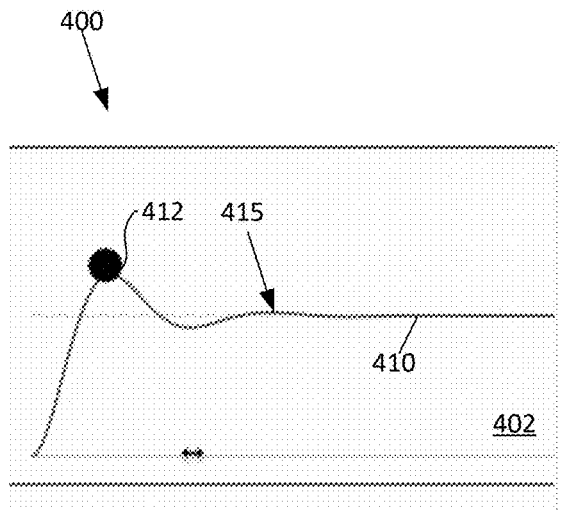
Figure 4D:
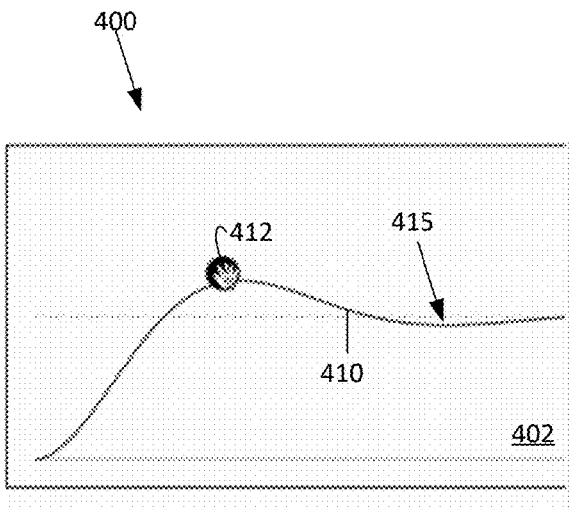

With reference to FIG. 3, a designer can interact with various features of the tool panel 300 to specify properties of a desired animation as between the objects, frames or states that are selected as starting and ending points for an animation.

The tool panel 300 includes features for enabling the user to select animation settings and further to specify configurations for the animations. For example, the user can select a type of animation, reflecting, for example, a feature 301 to select a type of movement (e.g., physical system that is represented by the animation), and a feature 304 to specify a time duration of a specified animation. As an addition or variation, the tool 300 can enable the user to select Bezier or easing curves for designated animations.

In examples, tool panel 300 provides a graph feature 302 to include a graph 315 that includes line segment 310 and knob 312. The line segment 310 can reflect the properties of a current animation behavior. For example, the profile of line segment 310 can reflect properties of a spring equation that is used for generating the animation behavior. In this way, the shape of the line segment 310 may also visually represent the movement represented by the corresponding animation behavior.

In examples, the knob 312 provides an example of an interactive component that can receive input (e.g., graph input 205) to manipulate the line segment 310. The user interaction can cause the knob 312 to be moved and repositioned. Further, the user can provide selection input to grasp a point of the line segment 310 before moving or re-positioning the knob 312. When a point on the line segment 310 is grasped and moved, the properties associated with the line segment 310 are also altered, and the line segment contorts from its original profile to a new profile. Thus, for example, the knob 312 can be moved at one location to cause the graph feature to recalculate the parametric values of the equation for the graph. The graph is rendered in accordance with the new parametric values.

With reference to FIG. 4A through FIG. 4D, a tool panel 400 includes a graph feature 402 to receive input to directly manipulate a line segment 410 of a graph 415. In examples, the graph feature 402 can provide a movable and or positionable knob 412 that overlays the line segment 410. In some examples, the user can select a portion of the line segment 410, and the graph feature 402 responds by providing the knob 412 which the user can move. The user can move the knob feature 412 along the line segment 410 to alter the profile of the line segment. For example, the knob 412 can be manipulated to grasp the line segment 410 at a particular point and pull the line segment in a direction of the knob's movement (which may be specified by the user providing input to drag the knob 412).

In examples, the line segment 410 can be modeled after a spring force or motion equation. Thus, if the knob 412 is moved vertically, the graph feature 212 recalculates the spring properties used for the graph. The greater amplitude of the initial oscillation results in, for example, lower damping value for the spring equation. The initial displacement, combined with the lesser spring value alters the entire line segment 410, with additional oscillations forming downstream. Thus, the sharper (or more narrow) the vertical curve formed by the knob 412 for an initial oscillation effect, the greater the magnitude of the subsequent oscillations, which can have alternating directional amplitude. The resulting animation that is represented by the line segment 410 in the state can reflect "bouncy" movement. Likewise, when the knob 412 is moved laterally (e.g., along the X-axis), the spring properties can be recalculated to reflect greater stiffness, making the resulting oscillations more gradual (as reflected by the broader area of the oscillation curve). The resulting animation that is represented by the line segment 410 in the state can reflect "gradual" movement.

In examples in which the line segment 410 represents a spring force or motion model, manipulation of the line segment 410 can reflect mass, spring stiffness and spring damping. Further, as described with other examples, the graph feature 402 can calculate spring parameters of spring stiffness and damping, given a particular mass and profile for the line segment 410. Thus, as the user manipulates the line segment 410 to change its profile, the graph feature 402 can continuously calculate and recalculate the spring parameters.

Figure 5:
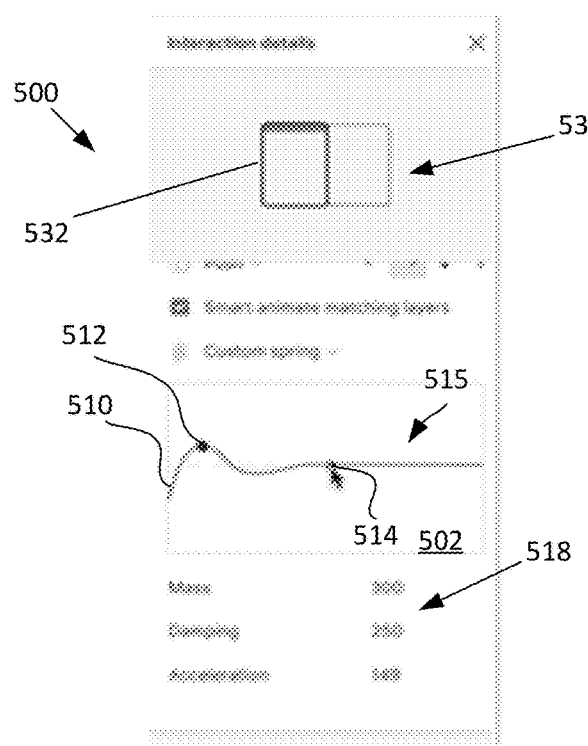
FIG. 5 illustrate another example tool panel that incorporates a graph feature and other functionality of a graph input component, according to one or more embodiments.

With reference to an example of FIG. 5, the tool panel 500 includes a graph feature 502 that provides a graph 515, along with a set of parametric values 518 for a corresponding spring equation (e.g., mass, damping and acceleration). In an example of FIG. 5, multiple knobs 512, 514 are provided to enable the line segment 510 to be manipulated at multiple points. As the knobs 512, 514 are moved, the profile of line segment 510 is changed, and the set of parametric values 518 is changed in real-time. Thus, for example, as the user moves one or both knobs 512, 514 to alter the line segment, the parametric values 518 representing spring characteristics are continuously changed in real-time.

The tool panel 500 can also include a panel 530 that visually indicates or previews the characteristics of an animation that results, based on, for example, the parametric values 518 of the line segment 510. The panel 530 can include a dynamic visual indicator 532 that is indicative of the animation that is specified by a current state of the line segment 510. The dynamic visual indicator 532 can be based on a generic set of objects. Alternatively, the dynamic visual indicator 532 can be based on objects which the user specifies for the animation. In examples, the user's input to adjust the line segment 510 can cause the dynamic visual indicator 532 to move and provide real-time visual feedback to the user as to the change.

In some examples, the tool panel 500 can also include menu features or other user-interface features that enable a user to select settings for the animation. The settings can, for example, specify a setting, such as a type of animation, a behavior or type of animation. The selection of the setting can determine the line segment 510 at an initial state, and the user may provide further input to manipulate the line segment.

Figure 6A:
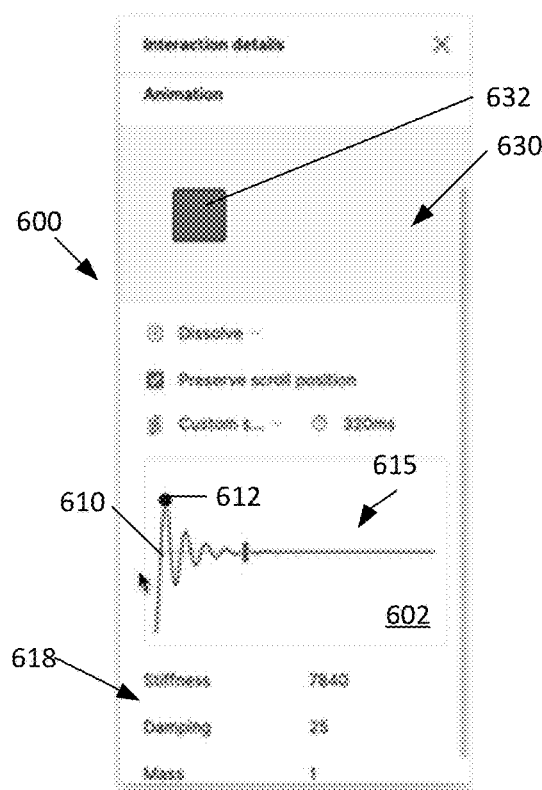
FIG. 6A through FIG. 6C illustrate another example tool panel that incorporates a graph feature and other functionality of a graph input component, according to one or more embodiments.
Figure 6B:
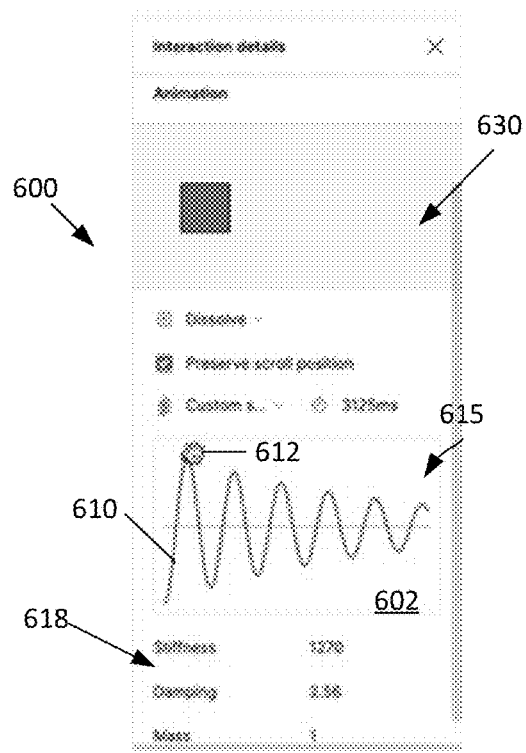
Figure 6C:
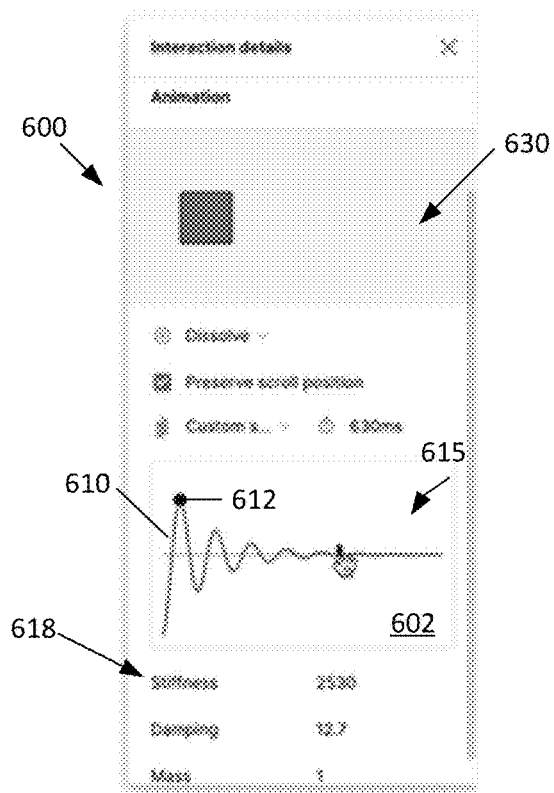

With reference to FIG. 6A through FIG. 6C, a tool panel 600 includes a graph feature 602 that displays a graph 615 with a set of parametric values 618. The graph 615 can be determined from a spring equation, and a line segment 610 of the graph 615 can be manipulatable by the user. In FIG. 6A, the line segment 610 can reflect a setting for a type of animation that the user selects from another feature of the tool panel 600. FIG. 6B illustrates the designer manipulating the line segment 610 by moving a knob 612 or other reference of the line segment 610 from the position shown FIG. 6A to the position shown in FIG. 6B. The change in the position of the knob 612 causes the line segment 610 to change in accordance with the spring equation, with parametric values 618 of the spring equation shown adjacent to the graph feature 602. The parametric values 618 can change in real-time responsive to manipulation of the line segment 610. Additionally, the duration of the animation can change automatically in response to a change in the spring parametric properties. For example, as the line segment 610 reflects a "bouncy" spring, the duration of the animation is extended to allow for animation that reflects a bouncy behavior.

FIG. 6C illustrates manipulation of a length of the line segment 610 to alter a duration of the spring effect (and animation behavior). In an example shown by FIG. 6C, a length of the line segment 610 is contracted or extended by a user moving a point of the line segment in a horizontal direction (along X-direction). When the line segment 610 is contracted, the duration of the animation is shortened. Likewise, when line segment 610 is extended, the duration of the animation is extended.

With further reference to FIG. 6A through FIG. 6C, a panel 630 of the tool panel 600 includes a graphic indicator of the animation that results from the line segment 610. In an example shown, the graphic indicator moves laterally within the panel 630 to illustrate one or more properties of the animation behavior that is to be generated by the line segment 610. In examples, the graphic indicator 632 can move within the panel 630 in response to the user making an adjustment to the graph feature 602, to provide real-time feedback for the user as to the nature of the change.

In some examples, the line segment 610 may be manipulated by a user to associate a specified duration (e.g., 100 ms, 500 ms, etc.) with a displacement of the line segment 610. For example, the user can move knob 612 to create a raised curve representing an initial oscillation for an animation. The user can associate a time interval with the particular point of the line segment, to represent an animation that reflects a pullback and release effect.

In some examples, the change in duration of the animation can affect multiple spring properties, in order to produce a spring animation that appears to be faster or slower (based on the duration increasing or decreasing). The user can interact either with the knob 612 or with another interactive element that is provided with the graph feature (e.g., on the graph background).

As further illustrated by examples of FIG. 6A through FIG. 6C, the parametric values 618 that accompany the graph feature 602 include spring characteristics such as stiffness, damping and mass. The parametric values 618 can be altered based on, for example, the type of animation which the user selects. For example, the parametric values 618 can reflect spring equation parameters, such as velocity (or initial velocity), and acceleration.

Network Computer System

Figure 7:
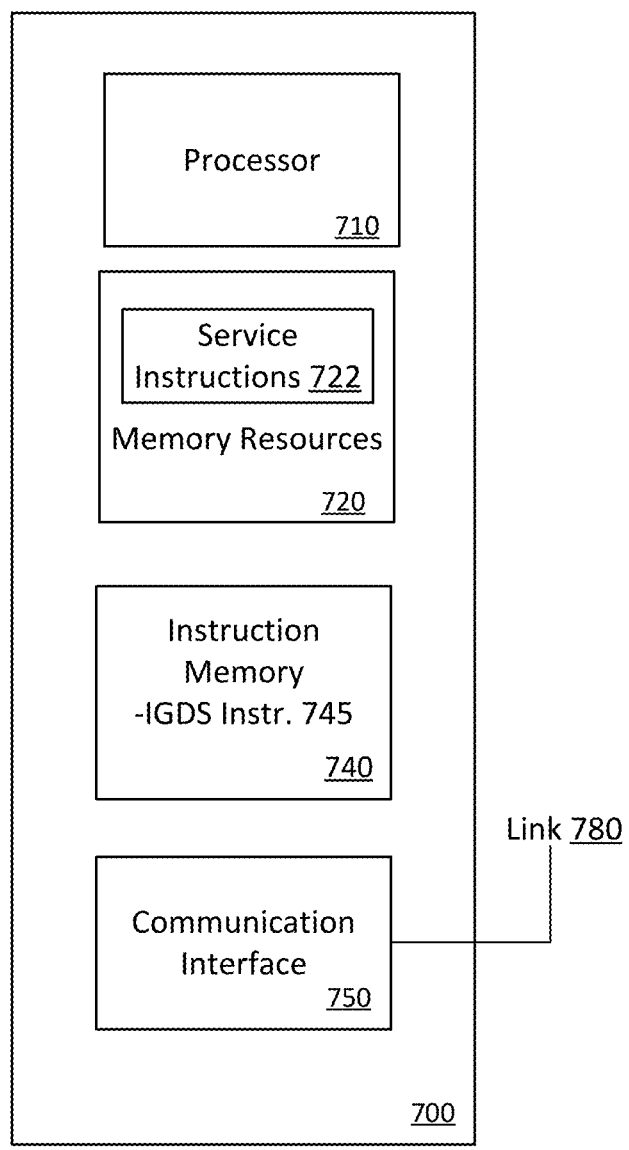
FIG. 7 illustrates a network computer system on which one or more embodiments can be implemented.

FIG. 7 illustrates a computer system on which one or more embodiments can be implemented. A computer system 700 can be implemented on, for example, a server or combination of servers. For example, the computer system 700 may be implemented as the network computing system 150 of FIG. 1A through FIG. 1C.

In one implementation, the computer system 700 includes processing resources 710, memory resources 720 (e.g., read-only memory (ROM) or random-access memory (RAM)), one or more instruction memory resources 740, and a communication interface 750. The computer system 700 includes at least one processor 710 for processing information stored with the memory resources 720, such as provided by a random-access memory (RAM) or other dynamic storage device, for storing information and instructions which are executable by the processor 710. The memory resources 720 may also be used to store temporary variables or other intermediate information during execution of instructions to be executed by the processor 710.

The communication interface 750 enables the computer system 700 to communicate with one or more user computing devices, over one or more networks (e.g., cellular network) through use of the network link 780 (wireless or a wire). Using the network link 780, the computer system 700 can communicate with one or more computing devices, specialized devices and modules, and/or one or more servers.

In examples, the processor 710 may execute service instructions 722, stored with the memory resources 720, in order to enable the network computing system to implement the network service 152 and operate as the network computing system 150 in examples such as described with FIG. 1A through FIG. 1C.

The computer system 700 may also include additional memory resources ("instruction memory 740") for storing executable instruction sets ("IGDS instructions 745") which are embedded with web-pages and other web resources, to enable user computing devices to implement functionality such as described with the IGDS 100.

As such, examples described herein are related to the use of the computer system 700 for implementing the techniques described herein. According to an aspect, techniques are performed by the computer system 700 in response to the processor 710 executing one or more sequences of one or more instructions contained in the memory 720. Such instructions may be read into the memory 720 from another machine-readable medium. Execution of the sequences of instructions contained in the memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 8:
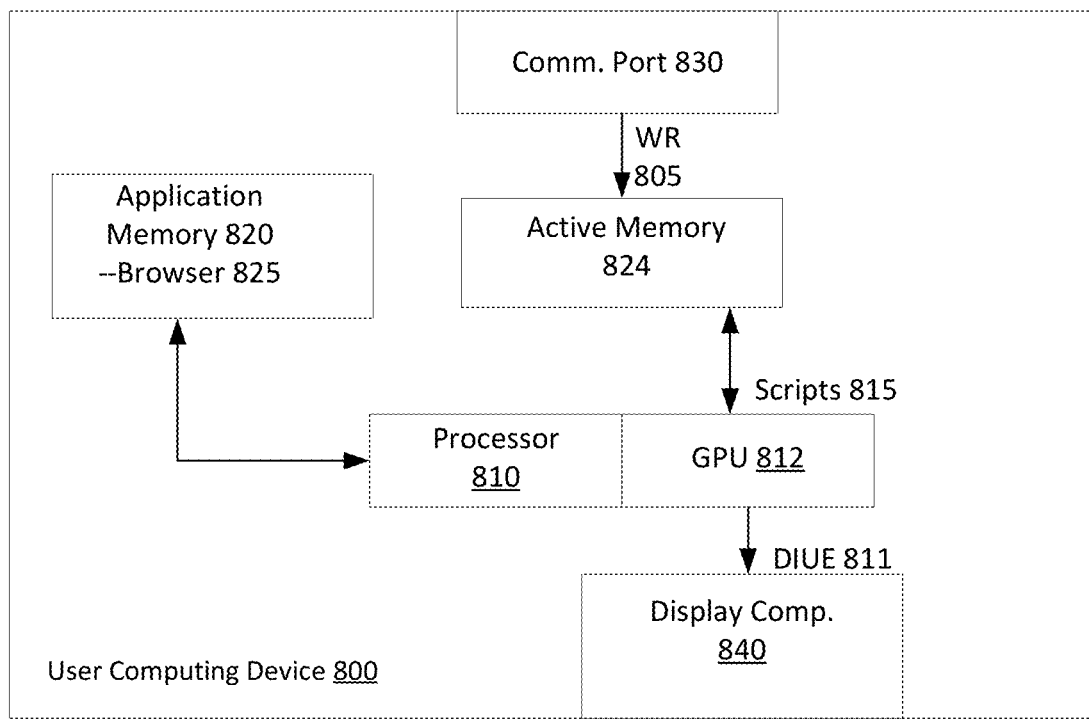
FIG. 8 illustrates a user computing device for use with one or more examples, as described.

FIG. 8 illustrates a user computing device for use with one or more examples, as described. In examples, a user computing device 800 can correspond to, for example, a workstation, a desktop computer, a laptop or other computer system having graphics processing capabilities that are suitable for enabling renderings of design interfaces and graphic design work. In variations, the user computing device 800 can correspond to a mobile computing device, such as a smartphone, tablet computer, laptop computer, VR or AR headset device, and the like.

In examples, the computing device 800 includes a central or main processor 810, a graphics processing unit 812, memory resources 820, and one or more communication ports 830. The computing device 800 can use the main processor 810 and the memory resources 820 to store and launch a browser 825 or other web-based application. A user can operate the browser 825 to access a network site of the network service 152, using the communication port 830, where one or more web pages or other resources 805 for the network service 152 (see FIG. 1A through FIG. 1C) can be downloaded. The web resources 805 can be stored in the active memory 824 (cache).

As described by various examples, the processor 810 can detect and execute scripts and other logic which are embedded in the web resource in order to implement the IGDS 100 (see FIG. 1A through FIG. 1C). In some of the examples, some of the scripts 815 which are embedded with the web resources 805 can include GPU accelerated logic that is executed directly by the GPU 812. The main processor 810 and the GPU can combine to render a design interface under edit ("DIUE 811") on a display component 840. The rendered design interface can include web content from the browser 825, as well as design interface content and functional elements generated by scripts and other logic embedded with the web resource 805. By including scripts 815 that are directly executable on the GPU 812, the logic embedded with the web resource 815 can better execute the IGDS 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
a memory sub-system to store a set of instructions;
one or more processors that operate to communicate the set of instructions to one or more user devices, wherein the set of instructions include instructions that when executed by each of the one or more user devices, cause the user device to perform operations that include:
generating an interactive animation interface, the interactive animation interface including a graph feature that is manipulatable to enable a user to specify one or more parametric values for configuring an animation behavior of a content rendering based on a spring equation, wherein the one or more parametric values represent one or more characteristics of spring motion, including one or more characteristics selected form a group that includes stiffness, damping, mass, initial velocity, and acceleration.

2. The network computer system of claim 1, wherein the operations include generating the animation behavior for the content rendering based on the one or more parametric values specified by the user.

3. The network computer system of claim 1, wherein the graph feature is manipulatable by the user to enable the user to specify at least two parametric values that at least partially define the animation behavior.

4. The network computer system of claim 1, wherein generating the interactive animation interface includes generating a knob in association with a line segment of the graph feature, the knob being moveable to affect a profile of the line segment, and wherein the one or more characteristics are based at least in part on the profile.

5. The network computer system of claim 4, wherein the operations include:
continuously altering the profile of the line segment based on a movement of the knob in one or more directions; and
continuously determining the one or more parametric values based on the profile of the line segment.

6. The network computer system of claim 5, wherein the operations include:
continuously displaying the one or more parametric values in conjunction with the graph feature.

7. A non-transitory computer-readable medium that stores instructions, including instructions that, when executed by one or more processors of a computing device, cause the computing device to perform operations to:
generating an interactive animation interface, the interactive animation interface including a graph feature that is manipulatable to enable a user to specify one or more parametric values for configuring an animation behavior of a content rendering based on a spring equation, wherein the one or more parametric values represent one or more characteristics of spring motion, including one or more characteristics selected form a group that includes stiffness, damping, mass, initial velocity, and acceleration.

8. The non-transitory computer-readable medium of claim 7, wherein the operations include generating the animation behavior for the content rendering based on the one or more parametric values specified by the user.

9. The non-transitory computer-readable medium of claim 7, wherein the graph feature is manipulatable by the user to enable the user to specify at least two parametric values that at least partially define the animation behavior.

10. The non-transitory computer-readable medium of claim 7, wherein, wherein generating the interactive animation interface includes generating a knob in association with a line segment of the graph feature, the knob being moveable to affect a profile of the line segment, and wherein the one or more characteristics are based at least in part on the profile.

11. The non-transitory computer-readable medium of claim 10, wherein the operations include:
continuously altering the profile of the line segment based on a movement of the knob in one or more directions; and
continuously determining the one or more parametric values based on the profile of the line segment.

12. The non-transitory computer-readable medium of claim 11, wherein the operations include:
continuously displaying the one or more parametric values in conjunction with the graph feature.

13. A method for operating a computing device, the method comprising one or more processors and comprising:
providing instruction to cause a computer device to perform operations including generating an interactive animation interface, the interactive animation interface including a graph feature that is manipulatable to enable a user to specify one or more parametric values for configuring an animation behavior of a content rendering based on a spring equation, wherein the one or more parametric values represent one or more characteristics of spring motion, including one or more characteristics selected form a group that includes stiffness, damping, mass, initial velocity, and acceleration.

14. The method of claim 13, further comprising:
generating the animation behavior for the content rendering based on the one or more parametric values specified by the user.

15. The method of claim 13, wherein the graph feature is manipulatable by the user to enable the user to specify at least two parametric values that at least partially define the animation behavior.

16. The method of claim 13, wherein generating the interactive animation interface includes generating a knob in association with a line segment of the graph feature, the knob being moveable to affect a profile of the line segment, and wherein the one or more characteristics are based at least in part on the profile.

17. The method of claim 16, wherein the method include:
continuously altering the profile of the line segment based on a movement of the knob in one or more directions; and
continuously determining the one or more parametric values based on the profile of the line segment.

18. The method of claim 17, wherein the method includes:
continuously displaying the one or more parametric values in conjunction with the graph feature.

* * * * *